US012646897B2

(12) United States Patent
Wang

(10) Patent No.: US 12,646,897 B2
(45) Date of Patent: Jun. 2, 2026

(54) CHARGING CONNECTOR AND CHARGING DEVICE

(71) Applicant: Changchun Jetty Automotive Technology Co., Ltd., Changchun (CN)

(72) Inventor: Chao Wang, Changchun (CN)

(73) Assignee: CHANGCHUN JETTY AUTOMOTIVE TECHNOLOGY CO., LTD., Changchun (CN)

( * ) Notice: Subject to any disclaimer, the term of this patent is extended or adjusted under 35 U.S.C. 154(b) by 287 days.

(21) Appl. No.: 18/286,712

(22) PCT Filed: Apr. 25, 2022

(86) PCT No.: PCT/CN2022/088974
§ 371 (c)(1),
(2) Date: Oct. 12, 2023

(87) PCT Pub. No.: WO2022/228382
PCT Pub. Date: Nov. 3, 2022

(65) Prior Publication Data
US 2024/0222919 A1 Jul. 4, 2024

(30) Foreign Application Priority Data
Apr. 26, 2021 (CN) .......................... 202110453314.7

(51) Int. Cl.
*H01R 31/06* (2006.01)
*B60L 53/16* (2019.01)
(Continued)

(52) U.S. Cl.
CPC .............. *H01R 31/06* (2013.01); *B60L 53/16* (2019.02); *H01R 13/04* (2013.01); *H01R 13/111* (2013.01);
(Continued)

(58) Field of Classification Search
CPC ...... H01R 31/06; H01R 13/04; H01R 13/111; H01R 13/2442; H01R 13/428;
(Continued)

(56) References Cited

U.S. PATENT DOCUMENTS

| | | | | |
|---|---|---|---|---|
| 5,613,863 A | * | 3/1997 | Klaus ..................... | H01R 31/06 D13/110 |
| 5,744,934 A | * | 4/1998 | Wu ........................ | H01R 27/00 320/111 |

(Continued)

FOREIGN PATENT DOCUMENTS

| | | |
|---|---|---|
| CN | 1080786 A | 1/1994 |
| CN | 201118039 Y | 9/2008 |

(Continued)

OTHER PUBLICATIONS

European Search Report from corresponding Application No. 22794852.8 mailed on Nov. 29, 2024, 20 pages.
(Continued)

*Primary Examiner* — Thanh Tam T Le
(74) *Attorney, Agent, or Firm* — Tucker Ellis LLP

(57) ABSTRACT

The present disclosure provides a charging connector and a charging device. The charging connector includes a control box and a power plug. The control box is electrically connected to a charging gun. The control box is provided with a three-phase terminal. The power plug is provided with a connecting structure which detachably connects the power plug with the control box and electrically connects the power plug with the three-phase terminal. By means of the present disclosure, the technical problem of poor adaptability of the charging device is solved.

20 Claims, 7 Drawing Sheets

(51) Int. Cl.

| | |
|---|---|
| *H01R 13/04* | (2006.01) |
| *H01R 13/11* | (2006.01) |
| *H01R 13/24* | (2006.01) |
| *H01R 13/428* | (2006.01) |
| *H01R 13/629* | (2006.01) |
| *H01R 13/73* | (2006.01) |
| *H01R 24/28* | (2011.01) |
| H01R 13/512 | (2006.01) |
| H01R 105/00 | (2006.01) |

(52) U.S. Cl.

CPC ....... *H01R 13/2442* (2013.01); *H01R 13/428* (2013.01); *H01R 13/629* (2013.01); *H01R 13/73* (2013.01); *H01R 24/28* (2013.01); *H01R 13/512* (2013.01); *H01R 2105/00* (2013.01); *H01R 2201/26* (2013.01)

(58) Field of Classification Search

CPC .... H01R 13/629; H01R 13/512; H01R 24/28; H01R 2105/00; H01R 2201/26; B60L 53/16

See application file for complete search history.

(56)                 References Cited

U.S. PATENT DOCUMENTS

| | | | | | |
|---|---|---|---|---|---|
| 5,934,921 | A | * | 8/1999 | Doong | H01R 27/00 439/172 |
| 5,973,948 | A | * | 10/1999 | Hahn | H01R 27/00 439/131 |
| 6,261,109 | B1 | * | 7/2001 | Liu | H01R 13/6271 439/174 |
| 6,638,113 | B2 | * | 10/2003 | Kajiwara | H01R 31/065 439/651 |
| 7,008,246 | B2 | * | 3/2006 | Zhuge | H01R 31/06 439/131 |
| 7,232,322 | B1 | | 6/2007 | Yen | |
| 7,264,492 | B2 | * | 9/2007 | Liang | H01R 24/28 439/151 |
| 7,300,297 | B1 | * | 11/2007 | Wang | H01R 27/00 439/173 |
| 7,547,219 | B2 | * | 6/2009 | Zhuge | H01R 31/065 439/173 |
| 7,654,838 | B1 | * | 2/2010 | Zhuge | H01R 27/00 439/173 |
| 7,794,251 | B2 | * | 9/2010 | Wen | H01R 27/00 439/171 |
| 8,251,718 | B2 | * | 8/2012 | Chen | H01R 31/06 439/131 |
| 8,358,106 | B2 | * | 1/2013 | Wu | H02J 7/02 320/111 |
| 8,382,526 | B2 | * | 2/2013 | Chen | H01R 13/639 439/655 |
| 8,811,051 | B2 | * | 8/2014 | Chan | H01R 31/06 363/146 |
| 8,888,513 | B2 | * | 11/2014 | Shi | H01R 13/44 439/131 |
| 8,936,490 | B2 | * | 1/2015 | Hsu | H01R 24/30 439/103 |
| 8,944,845 | B2 | * | 2/2015 | Yu | H01R 13/447 439/518 |
| 9,166,351 | B1 | * | 10/2015 | Wang | H01R 24/66 |
| 10,297,965 | B1 | * | 5/2019 | Yang | H01R 31/06 |
| 10,790,628 | B2 | * | 9/2020 | Landwehr | H01R 27/00 |
| 11,223,171 | B2 | * | 1/2022 | Zhang | H01R 27/00 |
| 11,472,302 | B2 | * | 10/2022 | Bae | B60L 50/60 |
| 2008/0293271 | A1 | | 11/2008 | Zhuge | |
| 2010/0062652 | A1 | * | 3/2010 | Liu | H01R 31/06 439/660 |
| 2019/0217730 | A1 | | 7/2019 | Götz et al. | |

FOREIGN PATENT DOCUMENTS

| | | | |
|---|---|---|---|
| CN | 201417806 | Y | 3/2010 |
| CN | 203521840 | U | 4/2014 |
| CN | 105870743 | A | 8/2016 |
| CN | 205621955 | U | 10/2016 |
| CN | 205790812 | U | 12/2016 |
| CN | 206678815 | U | 11/2017 |
| CN | 206893971 | U | 1/2018 |
| CN | 209448173 | U | 9/2019 |
| CN | 110861514 | A | 3/2020 |
| CN | 210363410 | U | 4/2020 |
| CN | 211390983 | U | 9/2020 |
| CN | 211957989 | U | 11/2020 |
| CN | 112038822 | A | 12/2020 |
| CN | 113193410 | A | 7/2021 |
| JP | S499977 | Y | 3/1974 |
| JP | S6427977 | U | 2/1989 |
| JP | 3165934 | U | 2/2011 |
| JP | 2013114871 | A | 6/2013 |
| TW | M293586 | U | 7/2006 |
| TW | M461228 | U | 9/2013 |

OTHER PUBLICATIONS

Japanese Office Action from corresponding Application No. 2023-561705 mailed on Nov. 19, 2024, 8 pages with translation.

International Search Report from corresponding International Application No. PCT/CN2022/088974, mailed Jul. 6, 2022, 5 pages with translation.

Second Office Action from corresponding Chinese Application No. 202110453314.7, issued on Jun. 15, 2023; 8 pages with translation.

First Office Action from corresponding Chinese Application No. 202110453314.7, issued on Oct. 25, 2022; 15 pages with translation.

Novelty Search Report i from corresponding Chinese Application No. 202110453314.7, ssued in Apr. 2021; 14 pages with translation.

Evaluation Report from corresponding Chinese Application No. 202110453314.7, dated Apr. 26, 2021; 5 pages with translation.

* cited by examiner

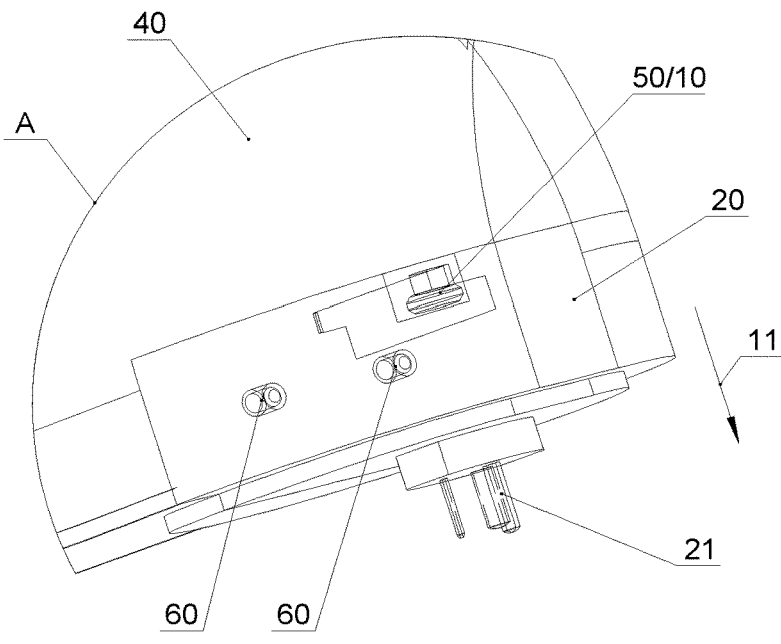
FIG. 5
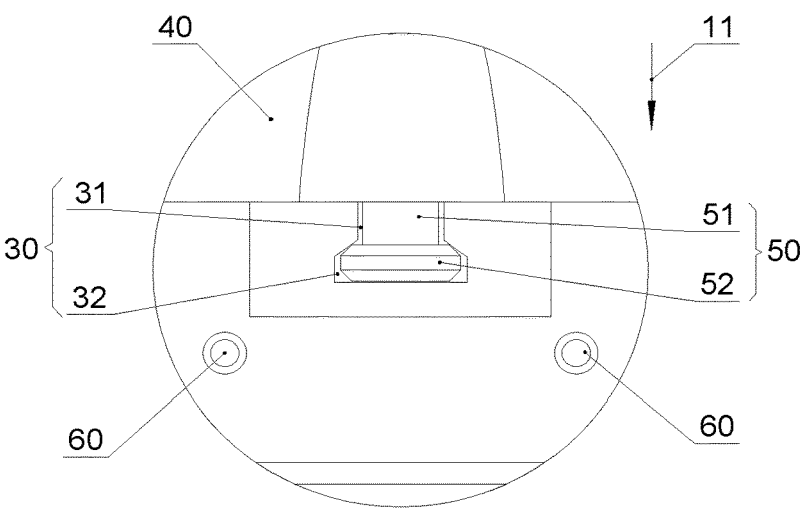
FIG. 6
FIG. 7

42

80

CHARGING CONNECTOR AND CHARGING DEVICE

CROSS-REFERENCE TO RELATED APPLICATIONS

The present disclosure is a National Stage of International Application No. PCT/CN2022/088974, filed Apr. 25, 2022, which claims priority to Chinese Patent Application No. 202110453314.7, entitled 'charging connector and charging device', and filed on Apr. 26, 2021, both of which are hereby incorporated by reference in their entireties.

TECHNICAL FIELD

The present disclosure relates to the technical field of electric vehicles, and particularly to a charging connector and a charging device.

BACKGROUND

The charging device of an electric vehicle usually includes a charging gun, a control box and a power plug. The control box and the charging gun are connected to each other through a cable. The control box and the power plug are connected to each other through a cable. The charging device is connected to the electric vehicle through the charging gun and connected to a power socket through the power plug. When this kind of charging device is used in different scenarios, sometimes there may be a situation that the power plug and the power socket cannot be adapted to each other, which leads to the inability to use and affects the convenience of use.

SUMMARY

An objective of the present disclosure is to provide a charging connector and a charging device, so as to solve the technical problem of poor adaptability of the charging device.

The above objective of the present disclosure can be achieved by adopting the following technical solutions.

The present disclosure provides a charging connector, including a control box and a power plug. The control box is electrically connected to a charging gun, and the control box is provided with a three-phase terminal. The power plug is provided with a connecting structure, and connecting structure detachably connects the power plug with the control box and electrically connects the power plug with the three-phase terminal.

The present disclosure provides a charging device, including a charging gun and the aforementioned charging connector. The charging gun is electrically connected to the control box.

The present disclosure has the following characteristics and advantages:

The charging gun is electrically connected to the control box in the charging connector according to the present disclosure, and the charging connector is connected to the electric vehicle through the charging gun. The power plug is detachably connected to the control box, so that the power plug can be conveniently replaced to adapt to a power socket, and the charging connector can be used movably, thereby improving the adaptability and convenience of the charging connector.

In the charging connector, the power plug and the control box are connected directly to each other, eliminating the cable between the power plug and the control box, which contributes to making the structure of the charging connector more compact and reducing the occupied space of the charging connector.

BRIEF DESCRIPTION OF THE DRAWINGS

The following drawings are only for the schematic illustration and explanation of the present disclosure, rather than limiting the scope of the present disclosure. In the drawings:

FIG. 5 illustrates a partial perspective view at A in FIG. 1;

FIG. 6 illustrates a schematic diagram of a slider being connected to a sliding groove;

FIG. 7 illustrates a partial enlarged view at B in FIG. 3C;

DETAILED DESCRIPTION

Figure 1:
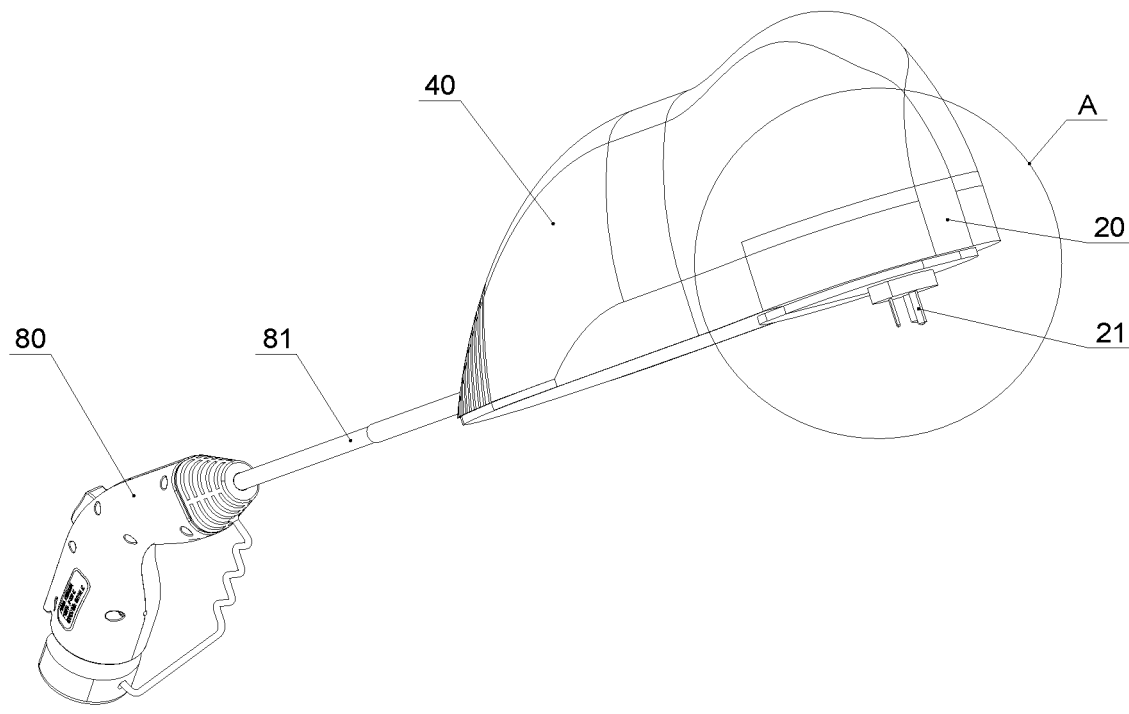
FIG. 1 illustrates a structurally schematic diagram of a charging device according to the present disclosure.

For a clearer understanding of the technical features, objectives and effects of the embodiments of the present disclosure, specific embodiments of the present disclosure will now be described with reference to the drawings. In the description of the present disclosure, 'a plurality of' means two or more unless otherwise specified.

Charging Connector

The present disclosure provides a charging connector, as illustrated in FIGS. 1 to 2B and 3B, including a control box 40 and a power plug 20. The control box 40 is electrically connected to a charging gun 80. The control box 40 is provided with a three-phase terminal 41. The power plug 20 is provided with a connecting structure which detachably connects the power plug 20 with the control box 40 and electrically connects the power plug 20 with the three-phase terminal 41.

The charging gun 80 is electrically connected to the control box 40 in the charging connector according to the present disclosure, and the charging connector is connected to the electric vehicle through the charging gun 80. The power plug 20 is detachably connected to the control box 40, so that the power plug 20 can be conveniently replaced to adapt to a power socket, and the charging connector can be used movably, thereby improving the adaptability and convenience of the charging connector.

In the charging connector, the power plug 20 and the control box 40 are connected directly to each other, eliminating a cable 81 between the power plug 20 and the control box 40, which contributes to making the structure of the charging connector more compact and reducing the occupied space of the charging connector.

In general, the control box 40 is connected to the power plug 20 and the charging gun 80 through a cable 81, respectively. As a result, during use, the control box 40 should be placed on a platform rather than being suspended. Therefore, the control box 40 generally should not be placed randomly, resulting in the charging gun 80 being able to extend over a range much smaller than a total length of the cable 81 between the control box 40 and the power plug 20 and the cable 81 between the control box 40 and the charging gun 80, i.e., the charging gun 80 being able to extend over a range much smaller than the total length of the cable 81 used by the charging device.

In the charging connector according to the present disclosure, the power plug 20 and the control box 40 are connected directly to each other. During use, the charging gun 80 is able to extend over a range substantially equal to a length of the cable 81 between the charging gun 80 and the control box 40, i.e., the charging gun 80 is able to extend over a range substantially equal to a total length of the cable 81 used by the charging device, which is beneficial to making full use of the cable 81, saving the cable 81, reducing the space occupied by the cable 81 and extending the charging range.

Connecting Structure

The connecting structure is not limited to one type. For example, the connecting structure includes a bolt connected to the power plug 20, the control box 40 is provided with a bolt hole, and the power plug 20 is mounted on the control box 40 by screwing the bolt to the bolt hole, so as to realize mounting the power plug 20 to the control box 40 and detaching the power plug 20 from the control box 40 by removing the bolt.

The inventor further improves the connecting structure.

Figure 4:
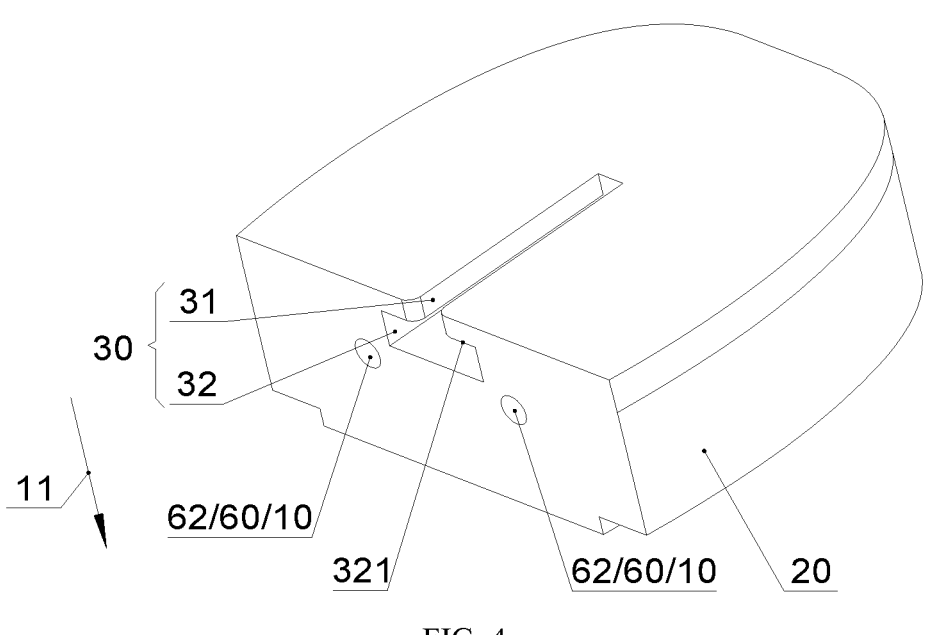
FIG. 4 illustrates a structurally schematic diagram of a power plug of the charging connector illustrated in FIG. 2A.

As illustrated in FIGS. 4 to 6, the connecting structure includes a sliding groove 30 disposed on the power plug 20, and the control box 40 is provided with a slider 50. The slider 50 is slidably embedded in the sliding groove 30 and is restricted from being separated from the sliding groove 30. The slider 50 and the sliding groove 30 have a function of guidance, and the power plug 20 is pushed along the sliding groove 30 during mounting so as to facilitate the mounting.

Further, the sliding groove 30 includes a first groove portion 31 and a second groove portion 32 being in communication with the first groove portion 31. The first groove portion 31 and the second groove portion 32 are sequentially distributed in a groove depth direction 11 of the sliding groove 30. The slider 50 penetrates the first groove portion 31, and an end of the slider 50 is disposed in the second groove portion 32. A top wall 321 of the second groove portion restricts a movement of the slider 50 in a direction opposite to the groove depth direction 11. As illustrated in FIGS. 4 and 6, a width of the second groove portion 32 is greater than that of the first groove portion 31, the top wall 321 of the second groove portion is close to the first groove portion 31, and the end of the slider 50 can abut against the top wall 321 of the second groove portion, so that the top wall 321 of the second groove portion blocks the movement of the slider 50 in the direction opposite to the groove depth direction 11, and a bottom wall of the second groove portion 32 blocks the movement of the slider 50 in the groove depth direction 11, thereby restricting the slider 50 from being separated from the sliding groove 30 in the groove depth direction 11 or in a direction opposite thereto.

As illustrated in FIG. 6, the slider 50 includes a connecting post 51 and a sliding portion 52 connected to an end of the connecting post 51. The connecting post 51 penetrates the first groove portion 31, the sliding portion 52 is disposed in the second groove portion 32, and a side wall of the sliding portion 52 is in contact with a side wall of the second groove portion 32 to guide the sliding portion 52 and the slider 50 to move in the sliding groove 30. Exemplarily, the sliding portion 52 is a revolving body, and an axis of the sliding portion 52 is disposed along the groove depth direction 11, so as to reduce a contact surface between the side wall of the sliding portion 52 and the side wall of the second groove portion 32, which is beneficial for the power plug 20 to move more smoothly. A diameter of the sliding portion 52 is greater than a width of the first groove portion 31, and a top surface of the sliding portion 52 can abut against the top wall 321 of the second groove portion. More favorably, the connecting post 51 is a cylinder, and an axis of the connecting post 51 coincides with the axis of the sliding portion 52, both of which are parallel to the groove depth direction 11.

On the one hand, the power plug 20 and the control box 40 need to be fixed together by a mechanical connection, and on the other hand, the three-phase terminal 41 of the control box 40 needs to be electrically connected to three pins 21 of the power plug 20. In order to achieve the electrical connection, the conventional connection mode between the pin 21 and the socket may be adopted. However, the inventor makes a further improvement.

One electrical terminal 10 of the three-phase terminal 41 is electrically connected to the slider 50. The second groove portion 32 is provided with a metal contact reed 22 which is electrically connected to one electrical terminal 10 of the power plug 20. Referring to FIGS. 3C and 7, in which FIG. 3C is a schematic diagram of the sliding groove 30 and the metal contact reed 22 of the power plug 20 that are connected to the control box 40, and the body of the power plug 20 is omitted in FIG. 3C. The slider 50 is connected to the metal contact reed 22 by contact. The slider 50 slides into the sliding groove 30 and contacts the metal contact reed 22, so that one electrical terminal 10 of the power plug 20 (i.e., one pin 21 of the power plug 20) is electrically connected to one electrical terminal 10 of the three-phase terminal 41. Specifically, the end of the slider 50 is constructed as a metal contact.

Further, the metal contact reed 22 is provided on the bottom wall of the second groove portion 32, and the metal contact reed 22 is constructed to apply an elastic force to the slider 50 in a direction opposite to the groove depth direction 11. The sliding portion 52 moves to a position corresponding to the metal contact reed 22 along the second groove portion 32. In this position, a bottom wall of the sliding portion 52 applies a pressure on the metal contact reed 22 in the groove depth direction 11, and the metal contact reed 22 is in close contact with the sliding portion 52 by its own elastic force, thereby ensuring the reliability of connection. In the charging connector, the slider 50 connects the control box 40 with the power plug 20 on the one hand, and achieves an electrical connection on the other hand, which simplifies the structure, ensures the reliability and stability of connection, facilitates the assembly and disassembly, and improves the convenience of use.

Figure 2A:
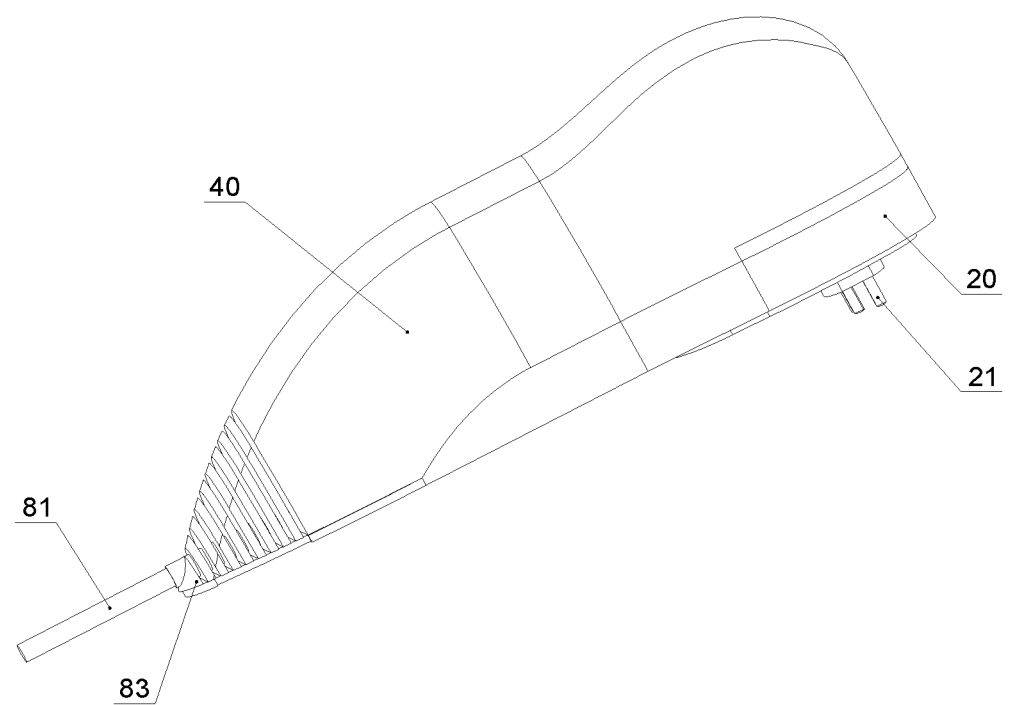
FIG. 2A illustrates a structurally schematic diagram of a charging connector according to the present disclosure.
Figure 3A:
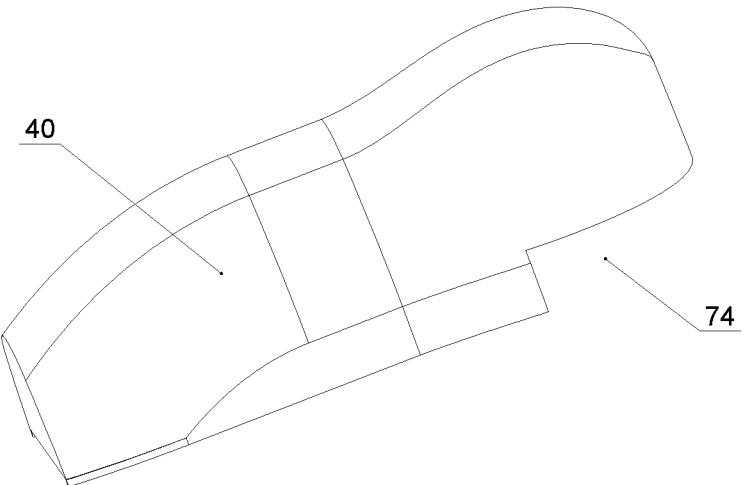
FIG. 3A illustrates a structurally schematic diagram of a control box of the charging connector illustrated in FIG. 2A.
Figure 3B:
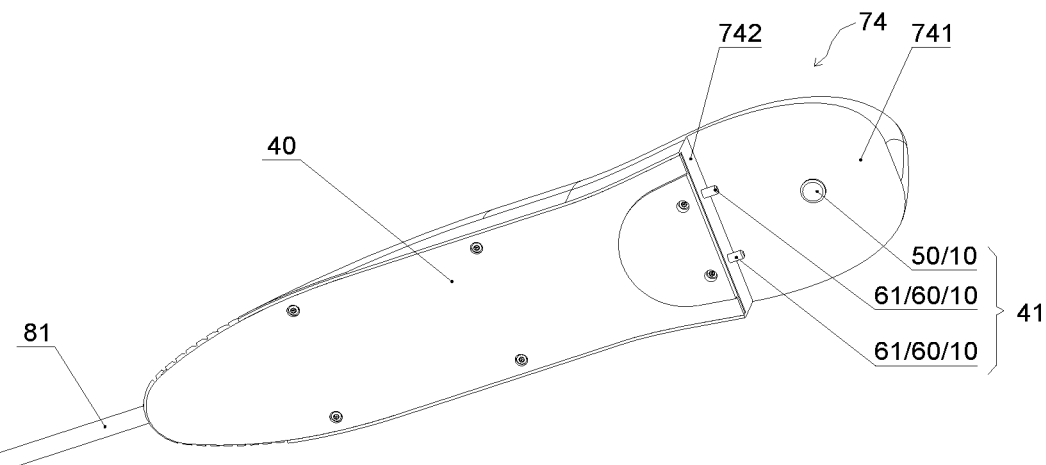
FIG. 3B illustrates a structurally schematic diagram of the control box illustrated in FIG. 3A from another perspective.
Figure 3C:
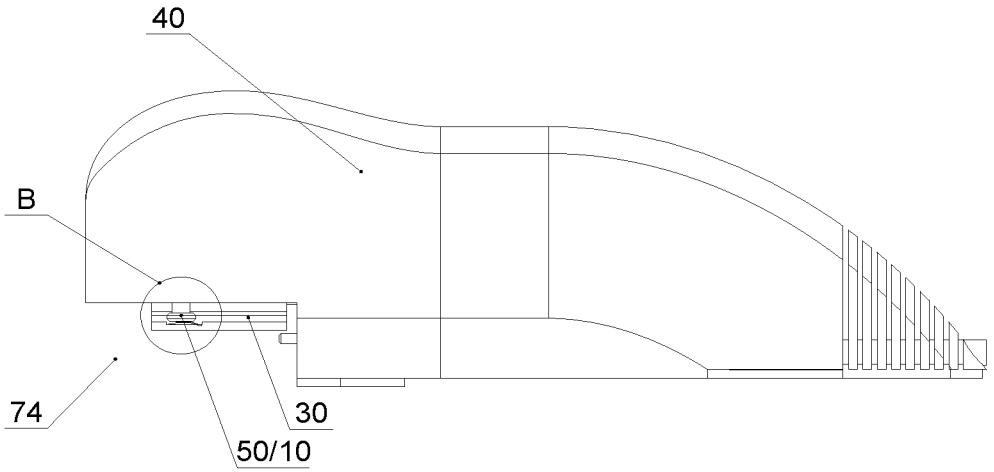
FIG. 3C illustrates a schematic diagram of a sliding groove and a metal contact reed in a power plug that are connected to the control box illustrated in FIG. 3A.

As illustrated in FIGS. 3A and 3B, the control box 40 is provided with a second accommodating groove 74 for accommodating the power plug 20. During use, the power plug 20 is mounted in the second accommodating groove 74, as illustrated in FIG. 2A, so as to facilitate mounting the power plug 20 and the control box 40 on an external power socket.

Figure 2B:
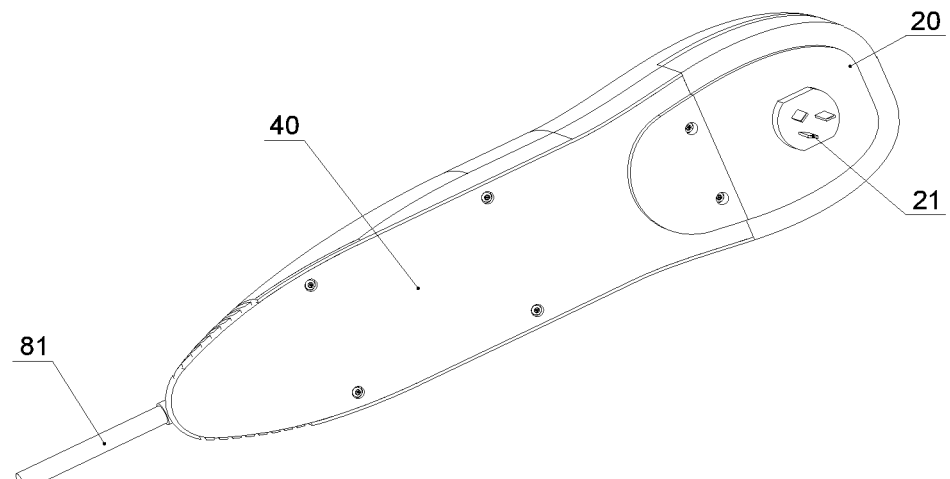
FIG. 2B illustrates a structurally schematic diagram of the charging connector illustrated in FIG. 2A from another perspective.

As illustrated in FIGS. 2B and 3B, the slider 50 is disposed on a bottom wall 741 of the second accommodating groove. at least one electrical terminal 10 of the three-phase terminal 41 is disposed on a side wall 742 of the second accommodating groove. The power plug 20 is constructed to be capable of being moved along the sliding groove 30 to abut against the side wall 742 of the second accommodating groove, and the power plug 20 is electrically connected to the electrical terminal 10 disposed on the side wall 742 of the second accommodating groove. During assembly, the power plug 20 is moved on the control box 40 along the sliding groove 30, so that under the guidance of the sliding groove 30, the power plug 20 can be moved toward the side wall 742 of the second accommodating groove more stably and smoothly, which is beneficial to ensuring the smooth engagement between the power plug 20 and the electrical terminal 10 on the side wall 742 of the second accommodating groove, thereby ensuring the stability of the electrical connection.

Figure 8:
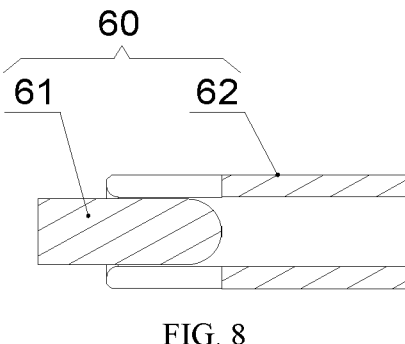
FIG. 8 illustrates a cross-sectional view of an engagement mechanism of the charging connector illustrated in FIG. 2A.
Figure 9:
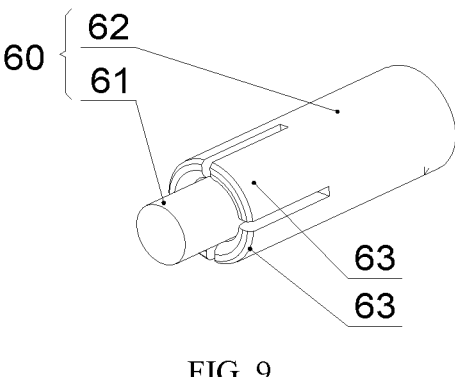
FIG. 9 illustrates a structurally schematic diagram of the engagement mechanism illustrated in FIG. 8.

Further, the charging connector includes a docking mechanism 60, which includes a conductive post 61 and a conductive barrel 62. As illustrated in FIGS. 8 and 9, the conductive post 61 is inserted into the conductive barrel 62 to be electrically connected to the conductive barrel 62. The conductive post 61 and the conductive barrel 62 are disposed in a sliding direction of the sliding groove 30. During mounting, the power plug 20 is moved along the sliding groove 30, so that the conductive post 61 is inserted into the conductive barrel 62, which is convenient to operate and makes the connection reliable.

In an embodiment, the conductive post 61 is constructed to be the electrical terminal 10 disposed on the side wall 742 of the second accommodating groove, and the conductive barrel 62 is disposed on the power plug 20.

In another embodiment, the conductive barrel 62 is constructed to be the electrical terminal 10 disposed on the side wall 742 of the second accommodating groove, and the conductive post 61 is disposed on the power plug 20.

The conductive barrel 62 inserted into and matched with the conductive post 61, with a friction force generated therebetween. With the friction force, the gravity of the control box 40 may be transferred to the power plug 20, so that the control box 40 can be carried by the power plug 20, thereby making it convenient to mount the control box 40 and the power plug 20 on an external power socket. As illustrated in FIGS. 2A and 2B, a longitudinal direction of the pin 21 of the power plug 20 may be disposed along the groove depth direction 11, i.e., the longitudinal direction of the pin 21 is perpendicular to the sliding direction of the sliding groove 30. As another embodiment, the longitudinal direction of the pin 21 of the power plug 20 may be disposed along the sliding direction of the sliding groove 30, and when being mounted on the power socket, the control box 40 and the power plug 20 are distributed up and down, so that the power plug 20 can carry the control box 40 conveniently.

As illustrated in FIG. 9, an end of the conductive barrel 62 is provided with a crimping arm 63 for pressing the conductive post 61 inward. During mounting, the guide post is inserted into the conductive barrel 62 to drive the crimping arm 63 to expand outward, and the crimping arm 63 is deformed to press the conductive post 61 inward by its elastic force, so that the connection between the power plug 20 and the control box 40 is more secure, which on the one hand facilitates the docking of the conductive post 61 and the conductive barrel 62, and on the other hand improves the reliability of connection.

The three-phase terminal 41 includes an L terminal, an N terminal and a PE terminal, and the power plug 20 includes the pins 21 of L-phase, N-phase and PE-phase corresponding to the L terminal, the N terminal and the PE terminal. Exemplarily, as illustrated in FIGS. 5 and 7, the slider 50 and the metal contact reed 22 are of PE-phase, and there are two docking mechanisms 60 being of L-phase and N-phase, respectively.

Figure 10:
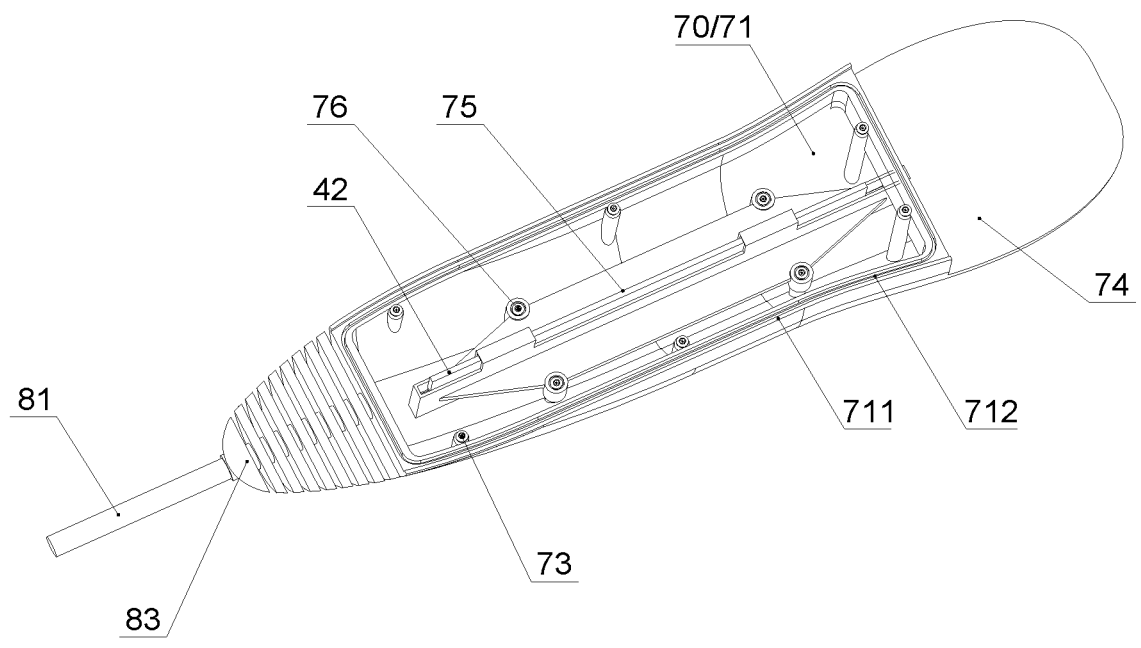
FIG. 10 illustrates a structurally schematic diagram of the interior of the control box illustrated in FIG. 3A.
Figure 11:
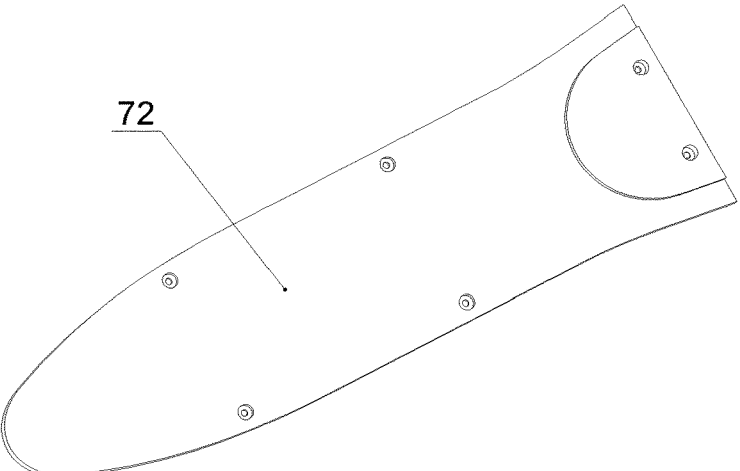
FIG. 11 illustrates a structurally schematic diagram of a lower cover of the control box illustrated in FIG. 3A.
Figure 12:
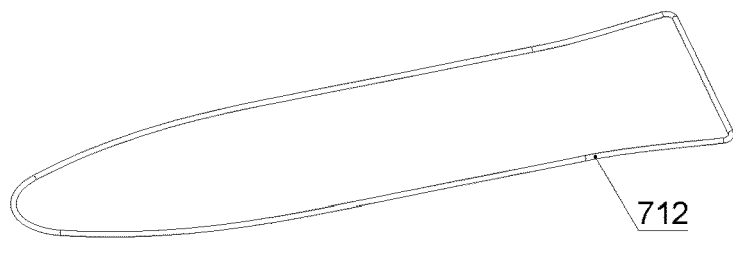
FIG. 12 illustrates a structurally schematic diagram of a sealing ring of the control box illustrated in FIG. 3A.
Figure 14:
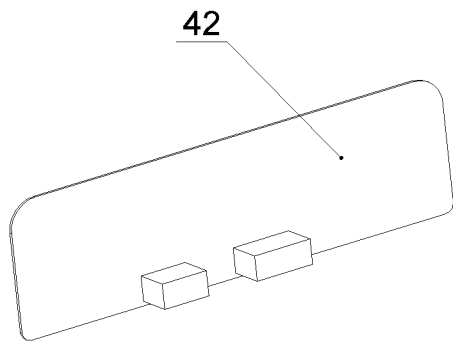
FIG. 14 illustrates a structurally schematic diagram of a circuit board of the control box illustrated in FIG. 3A.

As illustrated in FIGS. 10, 11 and 14, the control box 40 includes a housing 70 and a circuit board 42 mounted therein, and the three-phase terminal 41 is electrically connected to the circuit board 42. The three-phase terminal 41 serves as an input terminal of the control box 40, and the current is transmitted to the circuit board 42 through the three-phase terminal 41. The housing 70 protects the circuit board 42. The housing 70 includes an upper housing 71 and a lower cover 72. The upper housing 71 is provided with a cavity for accommodating the circuit board 42, and the upper housing 71 and the lower cover 72 may be fixedly connected to each other by a first screw 73. Further, as illustrated in FIGS. 10 to 12, an outer edge of the upper housing 71 is provided with a recess 711 for accommodating a sealing ring 712 which cooperates with the lower cover 72 to improve the sealability between the upper housing 71 and the lower cover 72 and improve the waterproof and dustproof performance.

Figure 13:
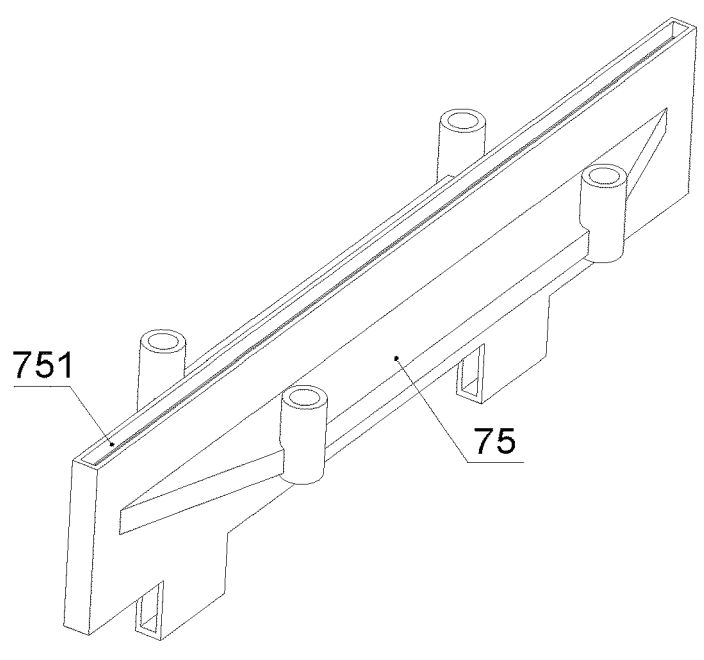
FIG. 13 illustrates a structurally schematic diagram of a rubber cushion of the control box illustrated in FIG. 3A.

The control box 40 includes a rubber cushion 75 mounted in the housing 70, and the rubber cushion 75 is provided with a first accommodating groove 751 for accommodating the circuit board 42. As illustrated in FIGS. 10 and 13, the rubber cushion 75 is fixed in the cavity of the upper housing 71 through a second screw 76, and the circuit board 42 is disposed in the second accommodating cavity, thereby contributing to improving the shock resistance and reliability of the charging connector.

Further, the cavity of the upper housing 71 is filled with glue for fixing the rubber cushion 75 and the circuit board 42, which is beneficial to improving the sealability and the reliability of connection. Specifically, when assembling the charging connector, the circuit board 42 and the rubber cushion 75 are mounted and fixed in the upper housing 71 through the second screw 76, then the sealing ring 712 is mounted in the recess 711 of the upper housing 71, then the glue is injected into the cavity of the upper housing 71, then the lower cover 72 is mounted on the upper housing 71 after the glue is solidified and cooled, then the first screw 73 is mounted, and finally the power plug 20 is mounted in the housing 70, thereby completing the assembly of the charging connector.

In the embodiment of the charging connector illustrated in FIG. 1, the control box 40 and the power plug 20 are abutted against each other through the connecting structure, to form a detachable integrated structure without a cable to connect the control box 40 and the power plug 20. On the one hand, it is convenient to replace the power plug 20 to adapt to the power socket, so as to facilitate mobile use of the charging connector, thereby improving the adaptability and convenience of the charging connector. On the other hand, it is beneficial to making the structure of the charging connector more compact and reducing the occupied space of the charging connector.

The charging connector may be provided independently, the control box 40 provides an interface for being connected to the charging gun 80, one end of the cable 81 is connected to the charging gun 80, and the other end of the cable 81 is detachably connected to the interface. As another embodiment, the charging connector may be provided in conjunction with the charging gun 80, the control box 40 and the charging gun 80 are connected through the cable 81, and the cable 81 and the control box 40 are fixedly connected. Exemplarily, as illustrated in FIGS. 1, 2A and 2B, the control box 40 is provided with an outlet rubber plug 83 through which the cable 81 passes, thereby improving the sealability.

By adopting the charging connector, the use of relays can be reduced, and at most two relays are required.

Charging Device

Figure 15:
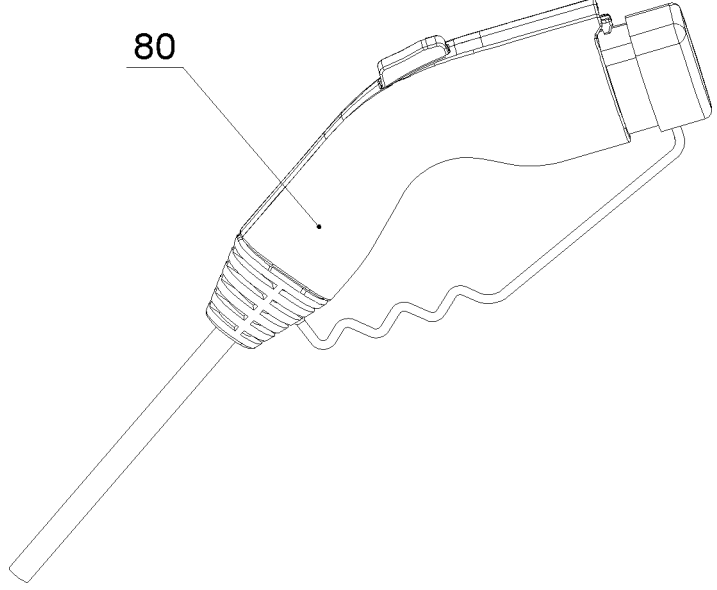
FIG. 15 illustrates a structurally schematic diagram of a charging gun of the charging device illustrated in FIG. 1.

The present disclosure provides a charging device, as illustrated in FIGS. 1 and 15, including a charging gun 80 and the aforementioned charging connector, and the charging gun 80 is electrically connected to the control box 40. The charging gun 80 is connected to the control box 40 through a cable 81, and the cable 81 is electrically connected to the circuit board 42 in the control box 40. The current transferred to the control box 40 is output to the charging gun 80 through the circuit board 42, and the circuit board 42 can control the current output of the control box 40 to guarantee stable charging of the electric vehicle. During use, the power plug 20 is connected to the control box 40 through a connecting structure, the power plug 20 is mounted on a power socket, and the charging gun 80 is connected to the electric vehicle to charge the electric vehicle.

Specifically, firstly, the circuit board 42 and the rubber cushion 75 are mounted and fixed in the upper housing 71 through a second screw 76, and the charging gun 80 and the control box 40 are connected through the cable 81; then a sealing ring 712 is mounted in the groove 711 of the upper housing 71; then glue is injected into the cavity of the upper housing 71; thereafter the lower cover 72 is mounted on the upper housing 71 after the glue is solidified and cooled; then the first screw 73 is mounted, and finally the power plug 20 is mounted in the housing 70, thereby completing the assembly of the charging connector.

The charging gun 80 is electrically connected to the control box 40 of the charging connector according to the present disclosure, and the charging connector is connected to the electric vehicle through the charging gun 80. The power plug 20 is detachably connected to the control box 40, so that the power plug 20 can be conveniently replaced to adapt to the power socket, thereby improving the adaptability and convenience of the charging connector.

In the charging device according to the present disclosure, the power plug 20 and the control box 40 are connected directly to each other, eliminating a cable 81 between the power plug 20 and the control box 40, which contributes to making the structure of the charging connector more compact and reducing the occupied space of the charging connector.

In the charging device, the power plug 20 and the control box 40 are connected directly to each other. During use, the charging gun 80 is able to extend over a range substantially equal to a length of the cable 81 between the charging gun

80 and the control box 40, which is beneficial to making full use of the cable 81, saving the cable 81, reducing the space occupied by the cable 81 and extending the charging range.

Those described above are specific embodiments of the present disclosure, rather than limitations to the scope of the present disclosure. Any equivalent change or modification made by those skilled in the art without departing from the concept and principle of the present disclosure should fall within the protection scope of the present disclosure.

What is claimed is:

1. A charging connector, comprising a control box and a power plug, wherein the control box is electrically connected to a charging gun, and the control box is provided with a three-phase terminal; and the power plug is provided with a connecting structure, and the connecting structure detachably connects the power plug with the control box and electrically connects the power plug with the three-phase terminal;

wherein the control box comprises a housing, a rubber cushion and a circuit board, and the three-phase terminal is electrically connected to the circuit board; and the rubber cushion is mounted in the housing, the rubber cushion is provided with a first accommodating groove, and the circuit board is disposed in the first accommodating groove.

2. The charging connector according to claim 1, wherein the connecting structure comprises a sliding groove disposed on the power plug, and the control box is provided with a slider which is slidably embedded in the sliding groove and restricted from being separated from the sliding groove.

3. The charging connector according to claim 2, wherein the sliding groove comprises a first groove portion and a second groove portion being in communication with the first groove portion;

the first groove portion and the second groove portion are sequentially distributed in a groove depth direction of the sliding groove, the slider penetrates the first groove portion, and an end of the slider is disposed in the second groove portion; and a top wall of the second groove portion restricts a movement of the slider in a direction opposite to the groove depth direction.

4. The charging connector according to claim 3, wherein the slider comprises a connecting post and a sliding portion connected to an end of the connecting post, the connecting post penetrates the first groove portion, and the sliding portion is disposed in the second groove portion.

5. The charging connector according to claim 3, wherein one electrical terminal of the three-phase terminal is electrically connected to the slider;

the second groove portion is provided with a metal contact reed electrically connected to one electrical terminal of the power plug; and the slider is connected to the metal contact reed by contact.

6. The charging connector according to claim 5, wherein the metal contact reed is provided on a bottom wall of the second groove portion and is constructed to apply an elastic force to the slider in a direction opposite to the groove depth direction.

7. The charging connector according to claim 2, wherein the control box is provided with a second accommodating groove for accommodating the power plug.

8. The charging connector according to claim 7, wherein the slider is disposed on a bottom wall of the second accommodating groove, and at least one electrical terminal of the three-phase terminal is disposed on a side wall of the second accommodating groove; and the power plug is constructed to be capable of being moved along the sliding groove to abut against the side wall of the second accommodating groove, and the power plug is electrically connected to the electrical terminal disposed on the side wall of the second accommodating groove.

9. The charging connector according to claim 8, wherein the charging connector comprises a docking mechanism comprising a conductive post and a conductive barrel, and the conductive post is inserted into the conductive barrel to be electrically connected to the conductive barrel; and the conductive post is constructed to be the electrical terminal disposed on the side wall of the second accommodating groove, and the conductive barrel is disposed on the power plug; or the conductive barrel is constructed to be the electrical terminal disposed on the side wall of the second accommodating groove, and the conductive post is disposed on the power plug.

10. The charging connector according to claim 9, wherein an end of the conductive barrel is provided with a crimping arm for pressing the conductive post inward.

11. A charging device, comprising a charging gun and a charging connector, wherein the charging connector comprises a control box and a power plug, and the charging gun is electrically connected to the control box;

the control box is electrically connected to a charging gun, and the control box is provided with a three-phase terminal; and the power plug is provided with a connecting structure, and the connecting structure detachably connects the power plug with the control box and electrically connects the power plug with the three-phase terminal;

wherein the control box comprises a housing, a rubber cushion and a circuit board, and the three-phase terminal is electrically connected to the circuit board; and the rubber cushion is mounted in the housing, the rubber cushion is provided with a first accommodating groove, and the circuit board is disposed in the first accommodating groove.

12. The charging device according to claim 11, wherein the connecting structure comprises a sliding groove disposed on the power plug, and the control box is provided with a slider which is slidably embedded in the sliding groove and restricted from being separated from the sliding groove.

13. The charging device according to claim 12, wherein the sliding groove comprises a first groove portion and a second groove portion being in communication with the first groove portion;

the first groove portion and the second groove portion are sequentially distributed in a groove depth direction of the sliding groove, the slider penetrates the first groove portion, and an end of the slider is disposed in the second groove portion; and a top wall of the second groove portion restricts a movement of the slider in a direction opposite to the groove depth direction.

14. The charging device according to claim 13, wherein the slider comprises a connecting post and a sliding portion connected to an end of the connecting post, the connecting post penetrates the first groove portion, and the sliding portion is disposed in the second groove portion.

15. The charging device according to claim 13, wherein one electrical terminal of the three-phase terminal is electrically connected to the slider;

the second groove portion is provided with a metal contact reed electrically connected to one electrical terminal of the power plug; and the slider is connected to the metal contact reed by contact.

16. The charging device according to claim 15, wherein the metal contact reed is provided on a bottom wall of the second groove portion and is constructed to apply an elastic force to the slider in a direction opposite to the groove depth direction.

17. The charging device according to claim 12, wherein the control box is provided with a second accommodating groove for accommodating the power plug, the slider is disposed on a bottom wall of the second accommodating groove, and at least one electrical terminal of the three-phase terminal is disposed on a side wall of the second accommodating groove; and the power plug is constructed to be capable of being moved along the sliding groove to abut against the side wall of the second accommodating groove, and the power plug is electrically connected to the electrical terminal disposed on the side wall of the second accommodating groove.

18. The charging device according to claim 17, wherein the charging connector comprises a docking mechanism comprising a conductive post and a conductive barrel, and the conductive post is inserted into the conductive barrel to be electrically connected to the conductive barrel; and the conductive post is constructed to be the electrical terminal disposed on the side wall of the second accommodating groove, and the conductive barrel is disposed on the power plug; or the conductive barrel is constructed to be the electrical terminal disposed on the side wall of the second accommodating groove, and the conductive post is disposed on the power plug.

19. The charging device according to claim 18, wherein an end of the conductive barrel is provided with a crimping arm for pressing the conductive post inward.

20. A charging connector, comprising a control box and a power plug, wherein the control box is electrically connected to a charging gun, and the control box is provided with a three-phase terminal; and the power plug is provided with a connecting structure, and the connecting structure detachably connects the power plug with the control box and electrically connects the power plug with the three-phase terminal;

the connecting structure comprises a sliding groove disposed on the power plug, and the control box is provided with a slider which is slidably embedded in the sliding groove and restricted from being separated from the sliding groove;

the sliding groove comprises a first groove portion and a second groove portion being in communication with the first groove portion;

the first groove portion and the second groove portion are sequentially distributed in a groove depth direction of the sliding groove, the slider penetrates the first groove portion, and an end of the slider is disposed in the second groove portion;

a top wall of the second groove portion restricts a movement of the slider in a direction opposite to the groove depth direction;

one electrical terminal of the three-phase terminal is electrically connected to the slider;

the second groove portion is provided with a metal contact reed electrically connected to one electrical terminal of the power plug; and the slider is connected to the metal contact reed by contact.

* * * * *